A. CHRISTIANSON.
TIRE CARRIER FOR AUTOMOBILES.
APPLICATION FILED MAY 16, 1917.
1,254,480.
Patented Jan. 22, 1918.
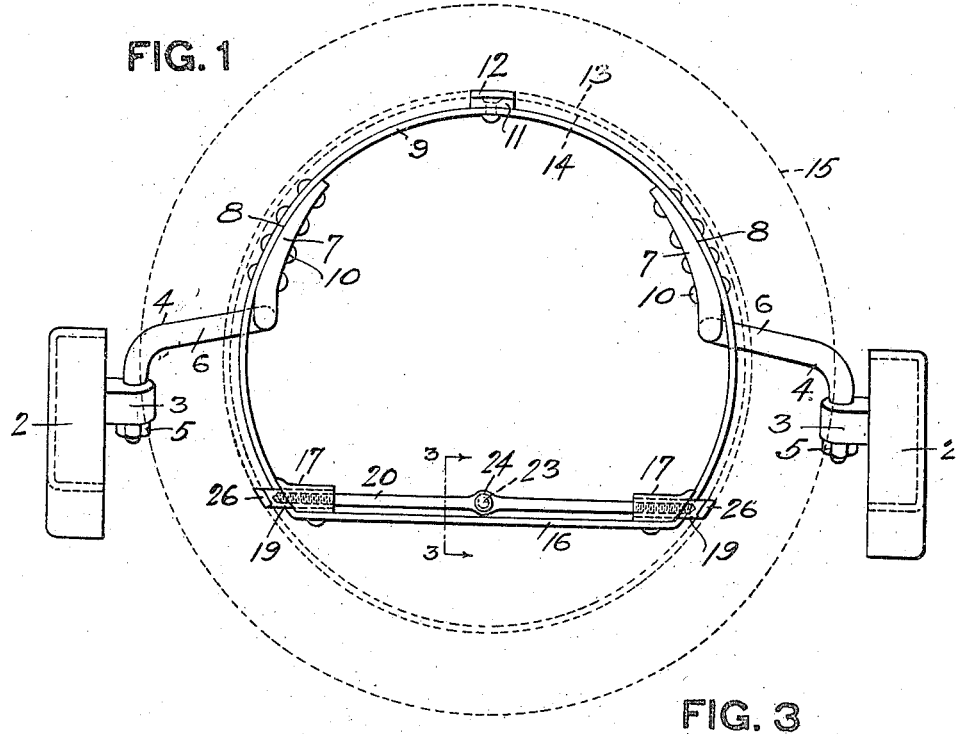
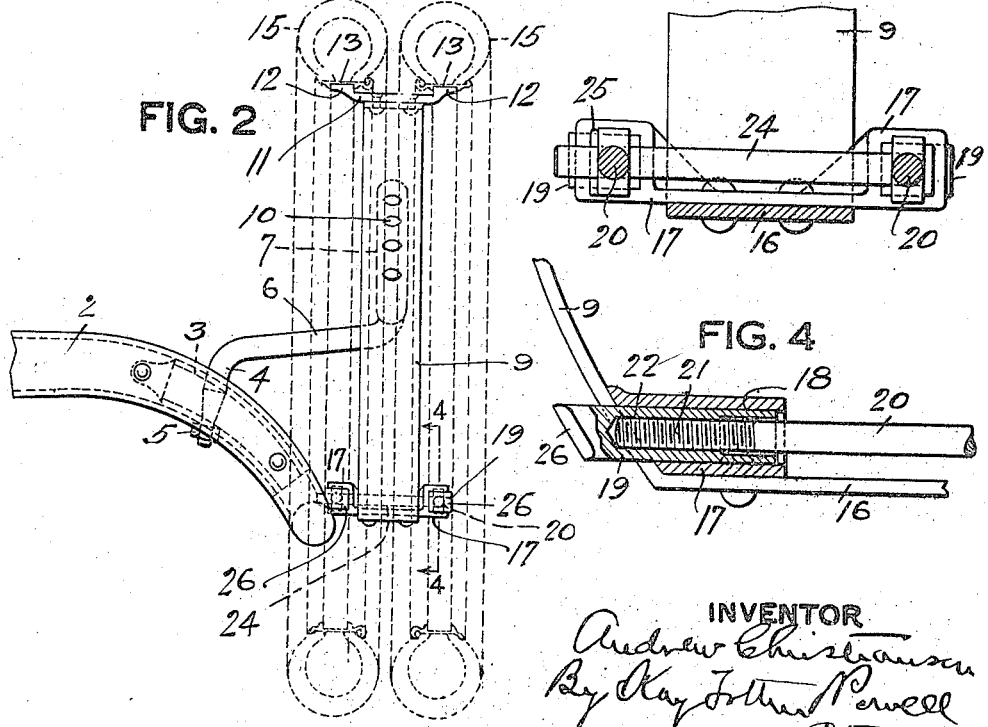
INVENTOR
Andrew Christianson
By Kay Totten Powell
attys

UNITED STATES PATENT OFFICE.

ANDREW CHRISTIANSON, OF BUTLER, PENNSYLVANIA.

TIRE-CARRIER FOR AUTOMOBILES.

1,254,480.

Specification of Letters Patent.

Patented Jan. 22, 1918.

Application filed May 16, 1917. Serial No. 168,950.

*To all whom it may concern:*

Be it known that I, ANDREW CHRISTIANSON, a citizen of the United States, and resident of Butler, in the county of Butler and State of Pennsylvania, have invented a new and useful Improvement in Tire-Carriers for Automobiles; and I do hereby declare the following to be a full, clear, and exact description thereof.

My invention relates to a tire carrier for automobiles.

The object of my invention is to provide a carrier which is simple in construction and by means of which the tires may be securely and safely supported in position and readily and quickly released therefrom.

In the accompanying drawing, Figure 1 is a face view of my improved tire carrier; Fig. 2 is an end view; Fig. 3 is an enlarged section on the line 3—3, Fig. 1, and Fig. 4 an enlarged section on the line 4—4, Fig. 2.

In the drawing the numeral 2 designates the rear portion of the body portion or chassis of an automobile which forms the support for my improved tire carrier. Lugs or brackets 3 are secured to the frame 2, and within said lugs or brackets are secured the arms 4 held in place by nuts 5. The arms 4 have the rearwardly extending portions 6 and the inwardly extending portions 7, the last-named portions being slightly curved as at 8 and forming supports for the band 9. This band 9 is secured to the curved portions 8 by rivets 10.

The band 9 has the seat 11 riveted or otherwise secured at the top thereof, said seat having the raised portions 12 which are adapted to engage the groove 13 on the rim 14 of the tires 15.

The lower ends of the band 9 are connected by the straight portion 16 and at each end of said straight portion are riveted the brackets 17 which project out beyond the bar, as shown in Fig. 3. In the projecting portions of the brackets 17 are the guides 18 in which the locking members 19 are adapted to move to and fro. To provide for the movement of the locking members, the rods 20 have the right and left hand threaded portions 21 which engage correspondingly threaded seats 22 in the locking members 19. In the mid-portions of the rods 20 are the openings 23 which receive the pin 24, said pin being held in place by the cotter pin 25 or a suitable lock.

The outer ends of the locking members 19 are formed as at 26 to conform substantially to the curve of the tire, and said end portions 26 are adapted to engage groove 13 of the tire rim 14.

When the tires 15 have been placed in position on the rim 9 with the portions 12 of the seats 11 engaging the grooves 13 in the rims 14, the pin 24 is withdrawn from the rods 20, and by inserting said pin in the opening 23 the rods 20 are turned thereby acting to advance the locking members 19 until their end portions 26 engage the grooves 13 of the tires and by tightening up in this manner the locking members act to lock the tire securely in position while supported on the band 9, and when the tires have been secured rigidly in position in this manner, the pin is again inserted to connect the rods 20 and prevent any movement of the same, so that the rods are locked in position, and there is no liability of their turning to release the locking members 19, and so weaken the support for the tires.

By my invention, I dispense with straps or other fastening means for securing the tires in position, and provide a simple and efficient device by means of which the tires are securely held in position and quickly and readily released when desired. It is apparent that the device will support one tire equally as well as two.

What I claim is:

A tire carrier comprising a circular band having a straight lower portion, brackets carried thereby having guides, locking members in said guides, rods having right and left hand threaded ends engaging said locking members, and a pin connecting said rods.

In testimony whereof, I the said ANDREW CHRISTIANSON, have hereunto set my hand.

ANDREW CHRISTIANSON.

Witnesses:
ROBT. D. TOTTEN,
JOHN F. WILL.